Dec. 5, 1939.    J. F. ANDERSON    2,182,107
AUTOMOBILE DRAFT SHIELD
Filed Jan. 30, 1939
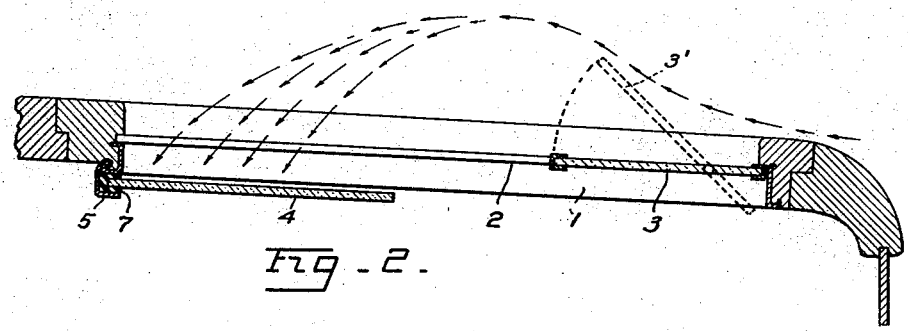
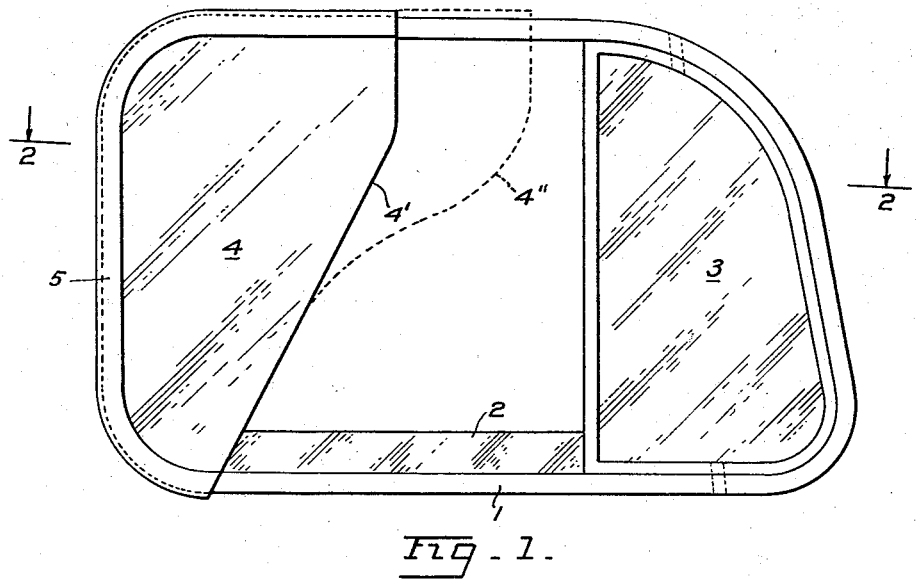
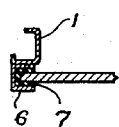
INVENTOR.
JOHN F. ANDERSON
BY
ATTORNEY.

Patented Dec. 5, 1939

2,182,107

UNITED STATES PATENT OFFICE 2,182,107

AUTOMOBILE DRAFT SHIELD

John F. Anderson, Oakland, Calif.

Application January 30, 1939, Serial No. 253,594

4 Claims. (Cl. 296—84)

This invention relates to means for preventing objectionable drafts in automobiles during travel of the car, and has for its principal object a special glass plate guard positioned adjacent the driver's window to prevent the air currents set up by the car in motion, from swirling violently in through the rear end of the open driver's window as is ordinarily the case. Special advantages and features of the invention will appear in the following description and accompanying drawing.

In the drawing:

Figure 1 is an elevation of a conventional window at the driver's side of the car as seen from within the car looking out, and shown fitted with one of my improved draft shields.

Figure 2 is a horizontal cross section as seen from the line 2—2 of Figure 1.

Figure 3 is a cross section showing a modification of the moulding for holding the glass shield panel in proper relation to the window moulding.

When driving an automobile it is necessary to keep the driver's window open to permit giving arm signals, and since the modern car is tapered toward its front end the rear end of the window extends outwardly further than the forward end so as to induce the passing air to be scooped into the rear end of the window. This effect is further augmented by the use of the pivoted side shields commonly provided at the forward ends of the front windows, for when these are turned outward they deflect the wind outward for a short distance but cause it to swirl around with even greater violence to enter the car through the rear portion of the side window of the driver's compartment, usually to strike the neck and back of the driver, as well as to cause great discomfort to anyone occupying the rear seat.

Various attempts to overcome this, some of which are shown in prior United States Patents Nos. 1,741,502, 2,034,528 and 1,681,507, but these do not properly provide for the giving of arm signals, and which is a particular advantage of my improvement.

In experimenting to solve the problem I have found that if a sheet of glass is placed vertically against the inside of the window frame so as to cover the rear end while slanting forwardly at its upper end, that it will effectually stop the objectionable draft yet give plenty of room for the arm signals when the main window is open.

In the drawing 1 is the usual moulding around the window and 2 is the main window glass shown almost lowered, 3 is the pivoted draft panel at the forward end of the window as commonly provided, and 4 is my special fixed panel of glass secured in position against the inner side of the window moulding.

The special glass panel 4 covers the rear end of the window and slants forwardly at its upper end as indicated at 4' and then extends vertically. The panel may extend still further forward as dotted at 4" with advantage, but entails an increased cost. The reason for the special form is to cover as much of the rear end of the window as well as some of the upper portion also, while leaving a free space between the forward edge of the panel 4 and the rear edge of panel 3 to project the arm in giving the arm signals.

The special panel 4 may be secured across the inside of the window by means of any suitable clips or frame, but as it is desirable that drafts be prevented from entering between the panel and the window moulding I prefer to mount the panel by means of a special sheet metal moulding 5.

Moulding 5 may be formed as shown in Figure 2 to hook under the edge of the window moulding 1, or it may be a simple U shaped channel as shown at 6 in Figure 3 welded to the window moulding 1 or formed integral with it. Within the special moulding is a soft rubber of felt lining or gasket 7 to embrace the margin of the special glass panel 4.

In operation of a car with the driver's window open the wind curls around to enter the window in a manner to cause the driver as well as all occupants considerable discomfort, and it was to reduce this nuisance that "side wings" and more recently the vertically pivoted glass panel 3 was devised.

However, while panel 3 when turned outwardly (as per dotted position 3' of Figure 2) will deflect the wind outwardly, it at once curls back again to enter the rear end of the window along the path indicated by the small arrows in Figure 2 to normally (in the absence of panel 4) cause great annoyance to the driver particularly, and to other occupants also.

With my special shield in place, it will be noticed by Figure 2 that the normal inward rush of air at the rear end of the window as denoted by the arrows, is entirely blocked, and with a result that the air passes outwardly and over the remaining portion of the car body, and the special panel therefore particularly cooperates with a forward vertically pivoted panel, though it also has value on cars not equipped with the forward panel.

It is also evident that while the device has especial application to the driver's side window, yet it may also be installed on any or all side windows of the car. It may also be noted that in some cars where special window sills and window locks are provided, suitable modifications in the mounting of the panel 4 will be made to care for such features or clear any working parts.

In my appended claims the word "glass" is to be taken as covering any transparent equivalent of it used in the manner described.

Having thus described my invention and its mode of operation, what I claim is:

1. In an automobile side window, a panel of glass positioned at the inner side of the window fixed in place to cover the rear end of the window opening while spaced inwardly from the main window pane to permit the latter's free sliding to open and closed position, the forward edge of said panel spaced rearwardly from the front end of the window to provide space for arm signalling said panel being relatively narrow at the bottom and gradually extending in breadth forwardly to the upper part of the panel.

2. In an automobile side window having a main window pane and a framing moulding around the window opening at the inside of the window, a panel of glass marginally formed to follow the moulding around the two rear corners of the window fixedly positioned substantially against the surface of said moulding in a manner and of a size to cover the rear end of the window openings while spaced inwardly from the main window pane to permit the latter's free sliding to open and closed position, the forward edge of said panel spaced rearwardly from the front end of the window to provide space for arm signalling.

3. In an automobile side window having a main window pane and moulding means extending around the window opening at the inside of the window, a panel of glass marginally formed to follow the moulding around the two rear corners of the window fixedly positioned in a manner and of a size to cover the rear end of the window openings while spaced inwardly from the main window pane to permit the latter's free sliding to open and closed position, the forward edge of said panel spaced rearwardly from the front end of the window to provide space for arm signalling, said moulding means engaging the edge of said panel.

4. In an automobile side window having a vertically pivoted wind deflecting glass panel in its forward end, and a vertically slidable window pane covering the remaining portion of the window opening, a glass sheet positioned at the inside of the window and of a size to cover the rear end of the window opening while preserving freedom for the window pane to slide and also providing arm projecting space between the forward edge of said glass sheet and the rear edge of the vertically pivoted panel, the forward edge of said glass sheet slanting forwardly to widen out the upper part of the sheet.

JOHN F. ANDERSON.